Patented Apr. 23, 1929.

1,710,141

UNITED STATES PATENT OFFICE.

RAYMOND C. BENNER, OF NIAGARA FALLS, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK.

METHOD OF RECOVERING SULPHUR FROM CARBONYL SULPHIDE.

No Drawing.   Application filed January 21, 1927.   Serial No. 162,571.

This invention relates to a method of purifying gases and more especially to a method of removing carbonyl sulphide from gases and the recovery of the sulphur therefrom in the elemental form. In many of the processes heretofore known and practised for the recovery of elemental sulphur from sulphur dioxide or directly from sulphide ores, serious difficulties have been encountered and certain of the processes have been rendered commercially inoperatable on account of the loss of sulphur in the form of carbonyl sulphide, or by the use of a large amount of steam to effect the decomposition of this substance.

We have discovered that carbonyl sulphide may be readily decomposed and the sulphur recovered therefrom in the elemental form by controlled oxidation thereof in the presence of activated bauxite. More particularly we have discovered that carbonyl sulphide may be readily oxidized in the presence of activated bauxite and a small amount of water vapor, either at high or low temperatures, with air, oxygen, sulphur dioxide or other oxidizing gas.

When sulphur dioxide is passed through a bed of incandescent carbonaceous fuel, the main products of the reduction are sulphur vapor, carbonyl sulphide, hydrogen sulphide, carbon dioxide and water vapor. Likewise, when sulphide ore is treated with cabonaceous fuel as, for example, in the Hall process, considerable amounts of carbonyl sulphide and hydrogen sulphide are evolved, as well as elemental sulphur. The relative proportions of carbonyl sulphide and hydrogen sulphide formed in either case will depend chiefly upon the quantity of water vapor normally present in the process and the quantity of water that may be added as steam. The effect of water is to increase the hydrogen sulphide and decrease the carbonyl sulphide, as carbonyl sulphide is quantitatively decomposed by steam, according to the equation

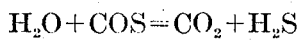

In many of the older processes, it has been considered necessary to decompose carbonyl sulphide into hydrogen sulphide by the addition of steam, and then to add a limited amount of air or sulphur dioxide to the hydrogen sulphide thus formed to produce elemental sulphur and water. Any of these methods are rendered economically difficult, not only by the added expense of using steam, but also by the incomplete conversion of the hydrogen sulphide to elemental sulphur, in accordance with the reversible equation $$2H_2S + SO_2 = 3S + 2H_2O$$

caused by the presence of the large amount of water vapor.

According to our invention, the gaseous products from the treatment of sulphur dioxide or sulphide ore with carbonaceous fuel, or the gases from any other source which contain carbonyl sulphide (and which may also contain hydrogen sulphide) are mixed with at least sufficient oxidizing gas, i. e., air, oxygen, sulphur dioxide, etc., to completely oxidize the carbonyl sulphide (and hydrogen sulphide) to elemental sulphur and the mixed gases contacted with activated bauxite at an elevated temperature. When the mixed gases are thus treated at comparatively high temperatures, say 300° to 700° C. practically no water vapor or its constituents are required to promote the oxidation. In any event, an amount of moisture equivalent to the normal humidity of the atmosphere will be found sufficient and no additional water vapor or steam will be required. The reactions occur according to the equations:

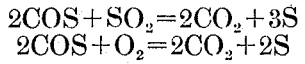

The gas mixture, leaving the activated bauxite catalyst, is cooled to condense the elemental sulphur produced and the sulphur is collected by any suitable means.

Bauxites of varying analyses may be employed to catalyze these reactions. In general we have found that those bauxites high in combined water, such as British Guiana and Öolitic bauxites are particularly active in catalyzing these reactions and retain their catalytic activity for long periods. However, Dalmatian bauxite, which contains only a moderate amount of combined water, has been found quite satisfactory. The bauxite is activated by slowly heating the natural mineral in granular or lump form to about 400° to 500° C., the temperature being maintained for several hours to cause substantial dehydration. The dehydration may be accomplished in vacuo, if desired.

Gases containing carbonyl sulphide may likewise be purified from this substance by the oxidation thereof with air, oxygen or sulphur dioxide at comparatively low temperatures, i. e., below 300° C. and the sulphur recovered in the elemental form. This process is particularly advantageous in removing small amounts and even up to 5% of carbonyl sulphide. In the treatment of a gas to oxidize the carbonyl sulphide at comparatively low temperatures, we have found, however, that small amounts of water vapor are required, the water apparently serving as a catalytic agent or carrier for the oxidation reaction.

For example, air is added to a gas containing one to two percent carbonyl sulphide by volume in such proportions as to provide at least sufficient oxygen to oxidize the carbonyl sulphide to carbon dioxide and sulphur. Preferably an excess of air will be employed to insure a complete oxidation. If the gas mixture is substantially free from water vapor or from substances which will form water vapor upon oxidation with the oxidizing gas present, a small amount of moisture is added to provide about 2.5% by volume of water vapor. Where, however, the gas mixture contains sufficient moisture none need be added. This gas mixture, when passed through a layer of activated bauxite at about 200° C. will be entirely freed from the carbonyl sulphide by the oxidation thereof with the oxygen. The reactions may occur according to the following equations:

$$2COS + 2H_2O = 2CO_2 + 2H_2S$$
$$2H_2S + O_2 = 2S + 2H_2O$$

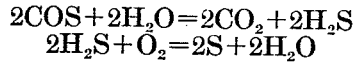

It will be noted that the water employed in the first reaction is re-formed in the second reaction, so that the combined reaction may be defined as $$2COS + O_2 = 2CO_2 + 2S$$

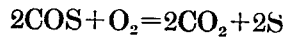

in the presence of water vapor. Sulphide dioxide may be employed as the oxidizing gas instead of air or oxygen, if desired. The oxidation of the carbonyl sulphide may be carried on at temperatures below 200° C. but this operation is not preferred because of the lower reaction speed, and consequently, greater proportion of catalyst required. The elemental sulphur produced by the oxidation of carbonyl sulphide at low temperatures condenses upon the catalyst. What elemental sulphur does not run out of the catalyst may be removed when the catalytic activity of the bauxite substantially decreases, by the application of heat or suitable solvents. The process may be carried out at ordinary or raised pressures, and various other modifications may be made without departing from the spirit of the invention.

We claim:

1. The process of producing elemental sulphur from gases containing carbonyl sulphide which comprises contacting a mixture of said gas and an oxidizing gas with activated bauxite.

2. The process of producing elemental sulphur from gases containing carbonyl sulphide which comprises contacting a mixture of said gas and sulphur dioxide with activated bauxite.

3. The process of removing carbonyl sulphide from gases which consists in contacting said gases with activated bauxite in the presence of an oxidizing gas and water vapor.

4. The process of removing carbonyl sulphide from gases which consists in contacting said gases with activated bauxite in the presence of an oxidizing gas and a small amount of water vapor and maintaining a temperature below 300° C.

5. The process of removing carbonyl sulphide from gases which consists in catalytically oxidizing carbonyl sulphide with sulphur dioxide in the presence of a small amount of water vapor at a temperature below 300° C.

In testimony whereof, we affix our signatures.

RAYMOND C. BENNER.
ALFRED PAUL THOMPSON.

CERTIFICATE OF CORRECTION.

Patent No. 1,710,141.  Granted April 23, 1929, to

RAYMOND C. BENNER ET AL.

It is hereby certified that error appears in the printed specification of the above numbered patent requiring correction as follows: Page 1, lines 32 and 33, for the misspelled word "cabonaceous" read "carbonaceous"; page 2, line 45, for the word "Sulphide" read "Sulphur"; and that the said Letters Patent should be read with these corrections therein that the same may conform to the record of the case in the Patent Office.

Signed and sealed this 28th day of May, A. D. 1929.

(Seal)

M. J. Moore,
Acting Commissioner of Patents.